| United States Patent [19] | [11] 3,839,230 |
|---|---|
| Cobzaru | [45] Oct. 1, 1974 |

[54] PROCESS FOR IMPROVING THE ACTIVE-ALUMINA CATALYST PROPERTIES

[75] Inventor: Aurel Cobzaru, Ploiesti, Romania

[73] Assignee: PETROCHIM Institutal De Cercetari Pentru Chimizarea Petrolului, Ploiesti, Romania

[22] Filed: Mar. 6, 1972

[21] Appl. No.: 232,261

[52] U.S. Cl. ................................. 252/463, 423/625
[51] Int. Cl. ............................................. B01j 11/06
[58] Field of Search ............. 252/463; 423/625, 631

[56] References Cited
UNITED STATES PATENTS

| 2,892,799 | 6/1959 | Brennan et al. ............... 252/463 X |
| 2,925,395 | 2/1960 | Vander Haar .................. 252/463 X |
| 2,932,620 | 4/1960 | Von Fuener et al. ........... 252/463 X |
| 2,939,848 | 6/1960 | Malo et al. ..................... 252/463 |
| 2,970,892 | 2/1961 | Kirshenbaum et al. ......... 252/463 X |

*Primary Examiner*—Daniel E. Wyman
*Assistant Examiner*—W. J. Shine
*Attorney, Agent, or Firm*—Karl F. Ross; Herbert Dubno

[57] ABSTRACT

A process for producing active aluminum with a surface area in the range of 50–200 m$^2$/g wherein performed alumina gel bodies are shaped and dried and the shaped dried bodies are autoclaved at a temperature of more than 100°C in contact with vapors of an aqueous ammonia solution containing 0.5 to 20 percent by weight $NH_3$ for a period of 2 to 12 hours. The resulting hydrated aluminum, with a molar ratio of water of crystallization to $Al_2O_3$ of less than 1.4, is thereafter calcined in air.

2 Claims, No Drawings

PROCESS FOR IMPROVING THE ACTIVE-ALUMINA CATALYST PROPERTIES

The present invention relates to a process for improving the catalytic properties of active alumina, the process comprising autoclaving the alumina gels at temperatures higher than 100°C with aqueous ammonia.

Active alumina is a good adsorbent material and a valuable support for a large number of catalysts.

The support plays an important role in the catalysts activity for a system using an alumina support. Thus the history of the support, in other words, the method of obtaining the hydrated alumina, as well as the treatments to which it is subsequently subjected have a determinant role upon the textural and crystallographic properties and upon the activity and stability of the obtained catalysts.

When a shaped active alumina is used (extruded, pill-shaped, ball-shaped etc.) the mechanical strength of the pellets must be taken into consideration.

There have been proposed several methods of obtaining the hydrated alumina, and transforming it into active alumina.

Generally speaking, the active alumina is obtained both from hydrated alumina produced by the Bayer process and from the alumina gels manufactured by various techniques.

The alumina gels are advantageous for chemical purity and at the same time are also easily shaped.

The surface area of the transition alumina obtained by a controlled thermal dehydration of those gels generally ranges between 200–400 m$^2$/g, corresponding to a high porosity. These qualities are sufficient for producing certain types of catalysts and consequently additional processes and treatements for obtaining the catalyst support are unnecessary.

However, it may be necessary to modify certain characteristics of the support, for instance, the surface area, the porosity etc.

For instance, certain heterogeneous catalytic processes require catalysts with surface areas of average values (50 - 200 m$^2$/g) and in such instances the alumina must be subjected to some additional treatment, e.g. a thermal treatment in air or steam at normal or higher pressure.

Such processes can bring about a reduction of the surface area and texture changes but, as a rule, the mechanical strength of the support is diminished. The phase composition of the hydrated alumina, which depends on the type of the transition alumina obtained by the thermal treatment also must be considered.

As a rule there was obtained an alumina gel by the common methods of preparation, which contains a mixture of mono and trihydrates in various proportions, more or less crystallized and even accompanied by an amorphous phase.

The richer the alumina gels in one of these components, the more uniform are the properties of the transition alumina obtained by practically total thermal dehydration.

In accordance with the invention, an alumina gel shaped in synthetic forms (cylinders, balls and pellets etc.) is subjected to autoclaving at a temperature higher than 100°C, preferably 150° to 250°C in the presence of an aqueous solution of ammonia with a content of 0.5–20 percent NH$_3$ by weight, over a period of 2-12 hours.

Agglomeration of the shaped gels into a gluey mass is prevented. I also obtain an increase in the degree of alumina boehmitization.

The hydrated alumina obtained in accordance with the process has an water content (water of hydration or crystallization) lower than 1.4 H$_2$O mole / mole of Al$_2$O$_3$, while the untreated hydrated alumina has a molecular ratio H$_2$O / Al$_2$O$_3$ exceeding 2.

The samples obtained with the proposed treatment and the thermal dehydration at temperatures higher than 500°C have a diminished surface area and a mechanical strength at least equal to that of the control sample not subjected to the treatment.

Example I.

I prepared an alumina gel by precipitation by combining aqueous solutions of aluminum nitrate and ammonia, under controlled temperature conditions (30°–40°C) and at a PH higher than 8.5.

The resulting alumina has a weight loss of 30 percent of weight upon calcination at 600°C and a molecular ratio of 2.15 H$_2$O / Al$_2$O$_3$.

The dried alumina gel was transformed into a paste by adding water and 0.5 percent in weight nitric acid compared with Al$_2$O$_3$. The paste was extruded at a diameter of 3 mm and was dried at 115°C for 4 hours.

The so shaped products were subjected to some thermal treatments at 600°–800°C in air and/or steam.

Before being air calcinated another portion was autoclaved at temperatures higher than 100°C, in the presence of water or in the presence of an aqueous ammonia solution containing 10 percent in weight NH$_3$, the extrudates not being in contact with the liquid phase. After autoclaving, the extrudates were dried and then calcined at 600°–800°C.

The autoclaving time was in all cases 4 hours, and the calcination time was 5 hours.

Before calcination, the molar ratio of H$_2$O / Al$_2$O$_3$ was determined for all samples, and after calcining the extrudate mechanical strength was measured as crushing strength, considering 100 as the mechanical resistance of non-autoclaved alumina sample calcined in air at 600°C, and the surface area was determined by the B.E.T. method.

The obtained results are illustrated in Table I.

One can see that the samples obtained by autoclaving the alumina in the presence of an aqueous ammonia solution at temperatures higher than 100°C has a diminished surface area and a fine mechanical strength. Autoclaving the alumina gel in the presence of water only at the same thermal level led to deformation and the agglomeration of the extrudates in a gluey mass.

Example 2.

The alumina gel obtained as in the first example, extruded and dried at 115°C for 4 hours, was autoclaved in the presence of an aqueous solution with different concentrations of ammonia at the same temperatures, after which was dried and air calcinated at 650°C for 5 hours.

The obtained results are given in Table II.

The mechanical strength of the calcined samples was determined at the crushing strength in comparison with sample one (table I) which was considered 100.

Before calcining the samples, there was determined the molecular ratio H$_2$O / Al$_2$O$_3$.

The process of autoclaving the alumina gels in the presence of a mixture steam - ammonia at a temperature higher than 100°C has the following advantages:

It gives the opportunity of obtaining an active alumina with physically and texturally controlled properties, the shaped alumina having a good mechanical strength.

There can be achieved a correction of the crystalographic composition of the alumina gel in the sense of increasing the boehmitization degree and of diminishing the quantity of amorphous or poorly crystallized forms which has a favorable effect especially when using the alumina gel as a starting material for a catalytic support.

I claim:

1. A process for producing active alumina which comprises the steps of: forming bodies of alumina gel by shaping said alumina gel and drying the shaped bodies; autoclaving the dried shaped bodies in contact with the steam and ammonia of and out of contact with the liquid phase of an aqueous ammonia solution containing 0.5 – 20 percent by weight $NH_3$ at a temperature of substantially 150° to 250°C for a period of 2 to 12 hours; and thereafter calcining the autoclaved bodies in air, the resulting active alumina having a surface area of substantially 50 to 200 $m^2/g$.

2. The product made by the process of claim 1.

TABLE I

| Sample Nr. | Type of treatment | Autoclaving temperature °C | Molar ratio $H_2O/Al_2O_3$ | Calcinating temperature °C | Surface area $m^2/g$ | Mechanical resistance in comparison with sample 1 | Observation |
|---|---|---|---|---|---|---|---|
| 1. | Hydrated alumina | — | 2.15 | 600 | 360 | 100 | control |
| 2. | air calcinated | — | 2.15 | 700 | 282 | 123 | |
| 3. | for 5 hours | — | 2.15 | 800 | 183 | 105 | |
| 4. | Activated alumina | — | — | 600 | 203 | 85 | The sample were initially air calcinated at 600°C. The extrudes were strained and formed a gluey mass. |
| 5. | calcinated in | — | — | 700 | 156 | 68 | |
| 6. | steam for 5 hours | — | — | 800 | 131 | 59 | |
| 7. | Hydrated alumina autoclaved in the presence of water | 180 | 1.35 | — | — | — | |
| 8. | Hydrated alumina | 180 | 1.38 | 600 | 192 | 102 | |
| 9. | autoclaved in the | 180 | 1.38 | 700 | 180 | 108 | |
| 10. | presence of an | 180 | 1.38 | 800 | 158 | 107 | |
| 11. | aqueous solution | 200 | 1.31 | 600 | 178 | 126 | |
| 12. | with 10% $NH_3$ | 200 | 1.31 | 700 | 173 | 122 | |
| 13. | | 200 | 1.31 | 800 | 140 | 100 | |
| 14. | | 220 | 1.27 | 600 | 147 | 131 | |
| 15. | | 220 | 1.27 | 700 | 140 | 110 | |
| 16. | | 220 | 1.27 | 800 | 134 | 106 | |

TABLE II

| Sample Nr. | The concentration of ammonia in the aqueous solution % $NH_3$ in weight. | Autoclaving temperature °C | Molar ratio $H_2O/Al_2O_3$ | Calcinating temperature °C | Surface area $m^2/g$ | Mechanical resistance compared with sample 1 (table I) |
|---|---|---|---|---|---|---|
| 17. | 1 | 190 | 1.36 | 650 | 170 | 118 |
| 18. | 5 | 190 | 1.37 | 650 | 167 | 109 |
| 19. | 15 | 190 | 1.39 | 650 | 178 | 97 |

* * * * *